United States Patent
Ruan et al.

(10) Patent No.: US 10,599,709 B2
(45) Date of Patent: Mar. 24, 2020

(54) OBJECT RECOGNITION DEVICE, OBJECT RECOGNITION METHOD, AND PROGRAM FOR RECOGNIZING AN OBJECT IN AN IMAGE BASED ON TAG INFORMATION

(71) Applicant: OMRON Corporation, Kyoto-shi, Kyoto (JP)

(72) Inventors: Xiang Ruan, Otsu (JP); Naru Yasuda, Uji (JP); Yanping Lu, Otsu (JP)

(73) Assignee: OMRON Corporation, Kyoto-shi (JP)

( * ) Notice: Subject to any disclaimer, the term of this patent is extended or adjusted under 35 U.S.C. 154(b) by 261 days.

(21) Appl. No.: 15/685,049

(22) Filed: Aug. 24, 2017

(65) Prior Publication Data

US 2017/0351934 A1    Dec. 7, 2017

Related U.S. Application Data

(63) Continuation of application No. PCT/JP2015/086206, filed on Dec. 25, 2015.

(30) Foreign Application Priority Data

Mar. 5, 2015   (JP) ................. 2015-043785

(51) Int. Cl.
*G06F 16/58* (2019.01)
*G06F 16/50* (2019.01)
*G06K 9/62* (2006.01)

(52) U.S. Cl.
CPC .............. *G06F 16/58* (2019.01); *G06F 16/50* (2019.01); *G06K 2009/6213* (2013.01); *G06K 2209/27* (2013.01)

(58) Field of Classification Search
None
See application file for complete search history.

(56) References Cited

U.S. PATENT DOCUMENTS

| 2001/0045948 | A1 | 11/2001 | Shiiyama |
| 2010/0077003 | A1 | 3/2010 | Kondo et al. |

(Continued)

FOREIGN PATENT DOCUMENTS

| JP | H11-015834 A | 1/1999 |
| JP | 2006-202049 A | 8/2006 |
| WO | 2008/152805 A1 | 12/2008 |

OTHER PUBLICATIONS

English translation of Written Opinion of PCT/JP2015/086206 dated Feb. 9, 2016 from the International Searching Authority.

(Continued)

*Primary Examiner* — Justin P. Misleh
(74) *Attorney, Agent, or Firm* — Metrolex IP Law Group, PLLC

(57) ABSTRACT

An object recognition device includes an acquisition unit configured to acquire a recognition target image that serves as an object to be recognized; a retrieval unit configured to search an image database storing a plurality of image data in association with tag information and retrieve a similar image that matches the recognition target image; and a recognition unit configured to recognize the object included in the recognition target image on the basis of tag information associated with a similar image obtained by the retrieval unit. The recognition may select the tag information that appears most frequently among the tag information associated with the similar images as a recognition result. The recognition unit may also compute a tag information reliability score from the similar image in the retrieval result and recognize an object taking into account said reliability score.

14 Claims, 12 Drawing Sheets

(56) References Cited

U.S. PATENT DOCUMENTS

| | | | | |
|---|---|---|---|---|
| 2010/0080470 | A1* | 4/2010 | Deluca | G06K 9/00664 |
| | | | | 382/209 |
| 2012/0134593 | A1* | 5/2012 | Becker | G06K 9/00979 |
| | | | | 382/195 |
| 2014/0280113 | A1* | 9/2014 | Hohwald | G06F 16/5866 |
| | | | | 707/728 |
| 2014/0376819 | A1* | 12/2014 | Liu | G06K 9/3233 |
| | | | | 382/205 |

OTHER PUBLICATIONS

The International Search Report of PCT/JP2015/086206 dated Feb. 9, 2016.

* cited by examiner

| Image No. | Relevance Score | Image Size (Overall) | Image Size (Similar Region) | Tag |
|---|---|---|---|---|
| 1 | 96 | 1024 × 768 | 800 × 400 | Automobile |
| 2 | 92 | 1920 × 1080 | 480 × 200 | Automobile |
| 3 | 88 | 640 × 480 | 300 × 150 | Car |
| 4 | 85 | 1024 × 768 | 750 × 350 | Sports car |
| 5 | 79 | 1280 × 720 | 200 × 160 | Parking lot |
| ... | ... | ... | ... | ... |

FIG. 7B

Example Criteria for Computing Tag Information Reliability Scores

| Correlation between tags | Increase tag information reliability score as correlation between tags included with image increases |
|---|---|
| Correlation between attribute information (meta-information) and tags | Increase tag information reliability score as correlation between tags and attribute information included with image increases |
| Size in Image | Increase tag information reliability score as size of region matching search target increases relative to size of entire similar image |
| Location in Image | Increase tag information reliability score as location of region matching search target approaches center of image |
| Relevance Score | Increase tag information reliability score as degree of similarity to search target increases |

OBJECT RECOGNITION DEVICE, OBJECT RECOGNITION METHOD, AND PROGRAM FOR RECOGNIZING AN OBJECT IN AN IMAGE BASED ON TAG INFORMATION

CROSS REFERENCE TO RELATED APPLICATIONS

This application is a continuation application of International Application No. PCT/JP2015/086206, filed on Dec. 25, 2015, which claims priority based on the Article 8 of Patent Cooperation Treaty from prior Japanese Patent Application No. 2015-043785, filed on Mar. 5, 2015, the entire contents of which are incorporated herein by reference.

FIELD

The disclosure relates to methods and devices for recognizing an object in an image.

BACKGROUND

A variety of techniques are available for recognizing what kind of object is being captured in an image. For instance, the technology for detecting a person's face from an image is quite common, as illustrated in Patent Document 1. This kind of recognition technique relies on creating a classifier beforehand on the basis of multiple images of the object to be recognized and then using the classifier during the recognition process.

Until now, however, the object to be recognized was somewhat limited because image capture was performed often manually and the object captured was often a person or scenery. The recent popularity of computer vision has increased the demand for the ability to recognize a larger variety of objects.

RELATED ART DOCUMENTS

Patent Documents

Patent Document 1: Japanese Patent Publication No. 2006-202049

SUMMARY

Technical Problem

Learning-based recognition techniques like those above mentioned only recognizes objects that were learned through training beforehand. However, creating a classifier that can be trained beforehand on the vast variety of objects that exists is impractical.

Further, when the classifier has poor recognition accuracy, images of the learning target must be collected and used to retrain the classifier. This retraining process requires specialist expertise that tends to be challenging for the normal user to perform appropriately. Consequently, improving recognition accuracy requires time and incurs cost.

One or more embodiments address the forgoing challenges by providing techniques that make it possible to recognize an object without requiring a training process.

Solution to Problem

One or more embodiments retrieve an image similar to a recognition target image from an image database and recognize the object on the basis of tag information associated with the similar image. Thus, an object in an image may be recognized without prior training.

More specifically an object recognition device according to one or more embodiments includes an acquisition unit configured to acquire a recognition target image that serves as an object to be recognized; a retrieval unit configured to search an image database storing a plurality of image data in association with tag information and retrieve a similar image that matches the recognition target image; and a recognition unit configured to recognize the object included in the recognition target image on the basis of tag information associated with a similar image obtained by the retrieval unit.

The image database stores a plurality of image data in a manner that the image data can be retrieved. The image database may be integrated with the object recognition device, or may be constructed as a separate device. For example, the image database may be a storage device provided with an object recognition device. The image database may also be built as a separate device accessible to the object recognition device via a communication network. The creator or administrator of the image database need not be the same as the creator or administrator of the object recognition device. A third-party image database publicly available via the internet may serve as the image database used in embodiments.

The image database may store tag information in association with the image data. Tag information represents and uses natural language to specify the content and attributes of the image data. The tag information may be added in any desired manner, e.g., the tag information may be input manually, or added automatically by a computer through image processing. This tag information may be encapsulated in the image data, or may be stored in a file separately from the image data.

The recognition unit may recognize an object on the basis of tag information associated with a similar image obtained by the retrieval unit. For example, the recognition unit may recognize an object included in an image on the basis of the frequency of tag information associated with a similar image. More specifically, the recognition unit selects the tag information that appears most frequently among the tag information associated with the similar images as the recognition result for the object included in the recognition target image. Alternatively, the recognition may select the tag information that appears most frequently among the tag information associated with the similar images as a recognition result. Here, the above-mentioned predetermined number may be a predefined value, a value that changes depending on the number of similar images acquired through retrieval, or may be the number of tag information where the number of occurrences thereof is greater than a certain value. The recognition unit does not need to perform recognition of an object based solely on the frequency of the tag information; the recognition unit may account for other elements when recognizing an object. In this case, the recognition unit may select tag information other than the tag information with the highest frequency as the recognition result.

The recognition unit may perform natural language processing to unify the variety of meanings among the tag information associated with the similar images, and after natural language processing recognize the object included in the recognition target image on the basis of the processed tag information. One example of unifying the variety of meanings may be unifying multiple words that have the same meaning. Another example of unifying the variety of meanings may be to select a representative word for multiple words that have different but similar meaning. A representative word may be any of the plurality of words contained in the tag information, or may be another word that includes the multiple words but express a higher-level concept. The recognition unit may select the tag information that appears most frequently after processing as the recognition result.

The recognition unit may compute a reliability score (a tag information reliability score) for the tag information associated with a similar image and recognize an object included in the recognition target image taking into account said tag information reliability score. There is no guarantee that the tag information associated with the image data in the image database is correct. The tag information reliability score is used in the object recognition process to prevent false recognition based on incorrect tag information.

The tag information reliability score is computed on the basis of a correlation between a plurality of tag information when a single similar image includes a plurality of tag information. There is tag information that tends to appear together in a single image, and tag information that tends to seldom appear together in the same image. Therefore, if the correlation (co-occurrence probability) between the plurality of tags included in a similar image is low, then it can be determined that the tag information reliability score for said similar image is low.

The methods of acquiring the correlation between tags are not particularly limited. For instance, a query may be sent to a tag information correlation database that stores the correlations between a plurality of tags to acquire the correlation for the tag information. The tag information correlation database may be created on the basis of the tag information in the image database, or may be a universal dictionary database that stores correlations between common words. The correlation between tag information may also be acquired by querying the image database each time. For instance, a request may be sent to the image database to obtain tag information that co-occurs with images containing a certain tag, and a correlation acquired on the basis of the result.

The tag information reliability score can also be computed on the basis of the relationship between the meta information and the tag information contained in a similar image. Meta information may include attribute information on the image itself (e.g., size, color space), and the imaging conditions (date taken, shutter speed, stop, ISO sensitivity measurement, metering mode, presence or absence of flash, focal length, imaging position or the like). The tag information reliability score for a similar image may be computed as a lower value on the basis of the correlation (co-occurrence probability) between at least any one of the above attribute information and tag information when the similar image includes attribute information that has a low correlation (co-occurrence probability) with the tag information. Consider the image capture location as an example of meta information (attribute information). It is unlikely that the tag information for "automobile" will be assigned to an image captured on the ocean; therefore, in this case, the tag information reliability score is computed as a low score. Note that it may be preferable that the correlation (co-occurrence probability) between the attribute information and the tag information is researched and stored in advance.

The assignment of a tag may be considered incorrect when the tag information reliability score for a certain similar image is low. Therefore, the recognition unit may assign a weight in accordance with the tag information reliability score and perform image recognition on the basis of the weight assigned. For instance, tag information with the highest weighted frequency may be selected as the object recognition result. The recognition unit may also perform object recognition without using a similar image when the tag information reliability score therefor is below a predetermined threshold.

The recognition target image may be an entire image or a local region. For example, the above described acquisition unit may be used to extract a local region from the input image to serve as a recognition target image. The local region may be extracted automatically by the object recognition device or input manually by a user.

The object recognition device according to embodiments may further include a relevance score computer configured to compute a relevance score for the local region; and the recognition unit may be configured to output a local region with a relevance score greater than or equal to a threshold as a recognition result. The method of computing a relevance score for a local region is not particularly limited. The relevance score may be computed on the basis of an input image or computed on the basis of retrieving an image similar to the local region from the image database. Object recognition need not be performed, or if performed the result therefor need not be output if the relevance score for a local region is below a certain threshold.

Finally, embodiments may be seen as an object recognition device including at least a portion of the above-mentioned means. Embodiments may also be seen as an object recognition method. Moreover, a program for executing the steps of these methods on a computer, or a computer readable medium temporarily storing such a program are also considered within the scope of the invention. The above-mentioned configurations and processes may be freely combined with each other insofar as is technically possible to configure the invention.

Effects

Embodiments recognize an object in an image even without carrying out a learning process beforehand.

BRIEF DESCRIPTION OF THE DRAWINGS

FIGS. 7A and 7B are of a second embodiment: FIG. 7A is a detailed flowchart of a process of recognizing an object recognition on the basis of tag information; and FIG. 7B depicts an example of criteria used in calculating a reliability score for tag information;

DETAILED DESCRIPTION

First Embodiment

Embodiments retrieve an image matching the recognition target image from an image database and recognize the object on the basis of tag information associated with the similar image. The tag information registered in association with the image data in the image database is employed in object recognition; therefore, object recognition can be performed without training process such as creating a classifier.

Configuration

Figure 1A:
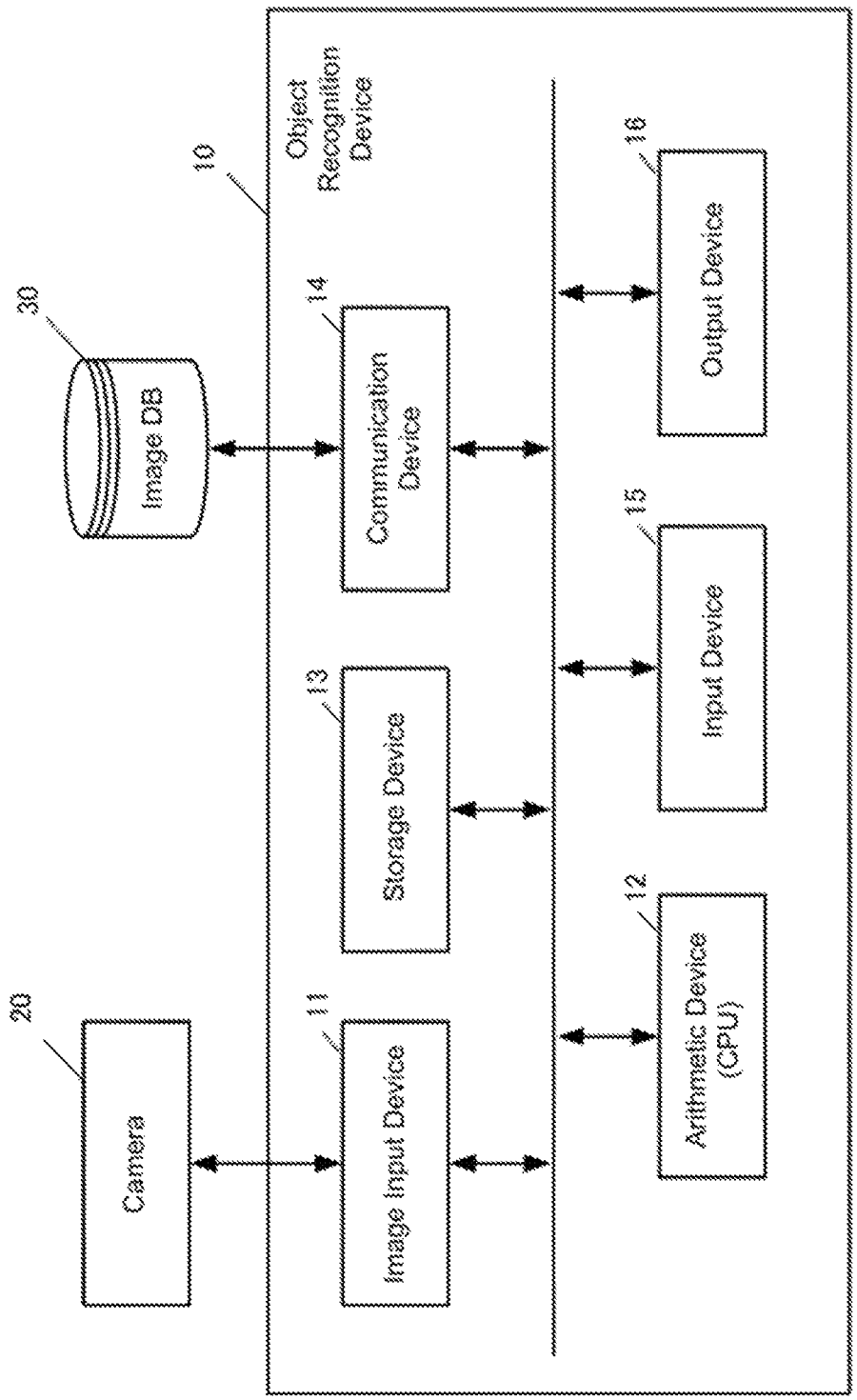
FIG. 1A is a block diagram of a hardware configuration of an object recognition device according to a first embodiment.

FIG. 1A is a function block diagram of an object recognition device 10 according to a first embodiment. The object recognition device 10 includes an image input unit 11, and arithmetic device 12, a storage device 13, a communication device 14, an input device 15, and an output device 16. The image input unit 11 is an interface for acquiring image data from a camera 20. Note that while in a first embodiment image data is directly acquired from the camera 20, the image data may be acquired through the communication device 14. The image data may also be acquired via storage media. The arithmetic device 12 is a general-purpose processor such as a central processing unit (CPU) that executes a program stored on the storage device 13 to implement the later described functions. The storage device 13 includes a primary storage device and an auxiliary storage device. In addition to storing the programs executed by the arithmetic device 12, the storage device 13 stores image data and temporary data while programs are being executed. The communication device 14 allows the object recognition device 10 to communicate with external computers. The form of communication may be wired or wireless, and may be provided under any desired standard. In a first embodiment the object recognition device 10 accesses an image database 30 via the communication device 14. The input device 15 may be configured by a keyboard or mouse or the like, and allows the user to enter instructions for the object recognition device. The output device 16 may be configured by a display device and a speaker or the like, and allows the object recognition device to provide output to the user.

The image database 30 is a computer including an arithmetic device and a storage device, and the like, and stores a plurality of image data so the same may be retrieved. The image database 30 may be a single computer or may be configured by multiple computers. Other than the data of the image itself (per pixel color information, for instance), the image data stored in the image database 30 may be stored in association with various kinds of attribute information. For example, a data file containing the image data may include various kinds of property information attribute information in the Exif format. The image database 30 may also map and store the image data in association with attribute information recorded in a file different from the data file for the image data. Attribute information may include for instance, the size of the image, the color space, the imaging conditions (date taken, shutter speed, stop, ISO sensitivity measurement, metering mode, presence or absence of flash, focal length, image location, and the like), a natural language description of the content and features of the image (tag information), and the like. This attribute information is meta-information for the image data. The image database 30 may be generally available via a public network such as the Internet and allow registration and searching of image data.

There are no particular restrictions on who may register an image in the image database 30 or on the number of images that can be registered. For instance, an image containing an object that a user of the object recognition device 10 should focus on may be registered to the database. In this case, it can be said that the registered image is suited for the recognition process and is provided with accurate tag information; therefore, a large quantity of images do not need to be registered. A third party such as an individual user or a search service provider may also register images in the database. However, in this case the registered image may be unsuitable for the recognition process and may be provided with less accurate tag information. Therefore, preferably many images are already registered in the image database 30.

Functions and Processes in the Object Recognition Device

Figure 1B:
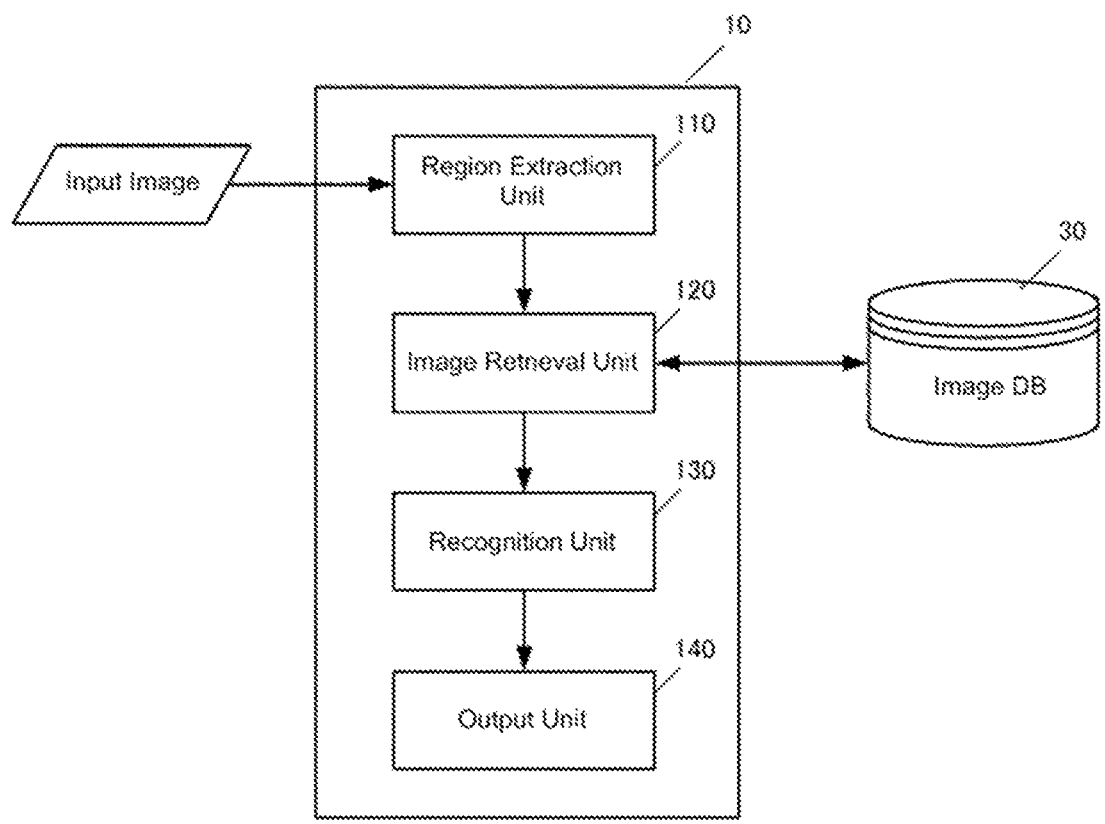
FIG. 1B is a function block diagram of an object recognition device according to a first embodiment.

The arithmetic device 12 may run a program to implement the kind of functions illustrated in FIG. 1B. That is, the arithmetic device 12 provides the functions of a region extraction unit 110, an image retrieval unit 120, a recognition unit 130, and an output unit 140. The processing in each of these units is as follows.

Figure 2:
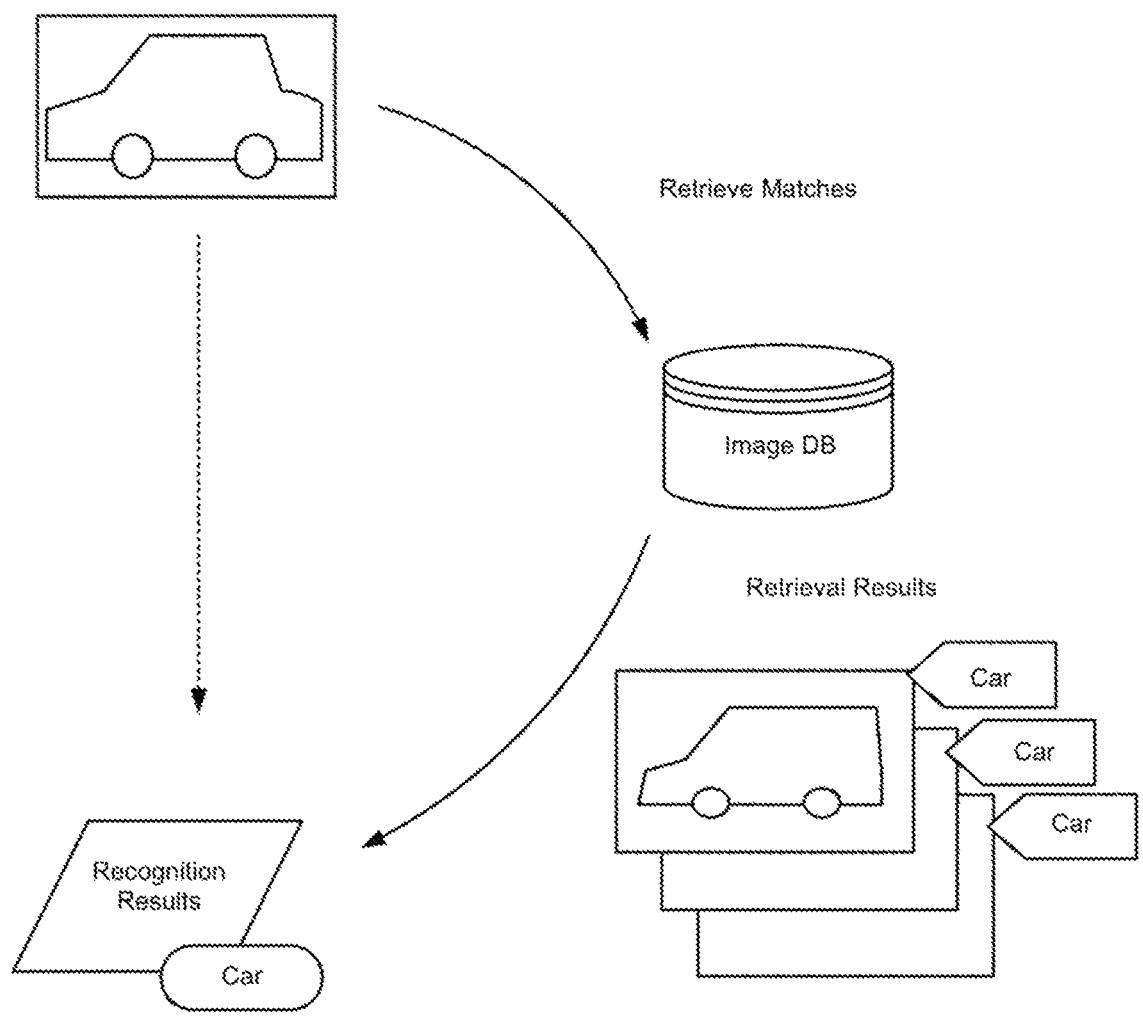
FIG. 2 is a schematic diagram for describing an object recognition process.
Figure 3:
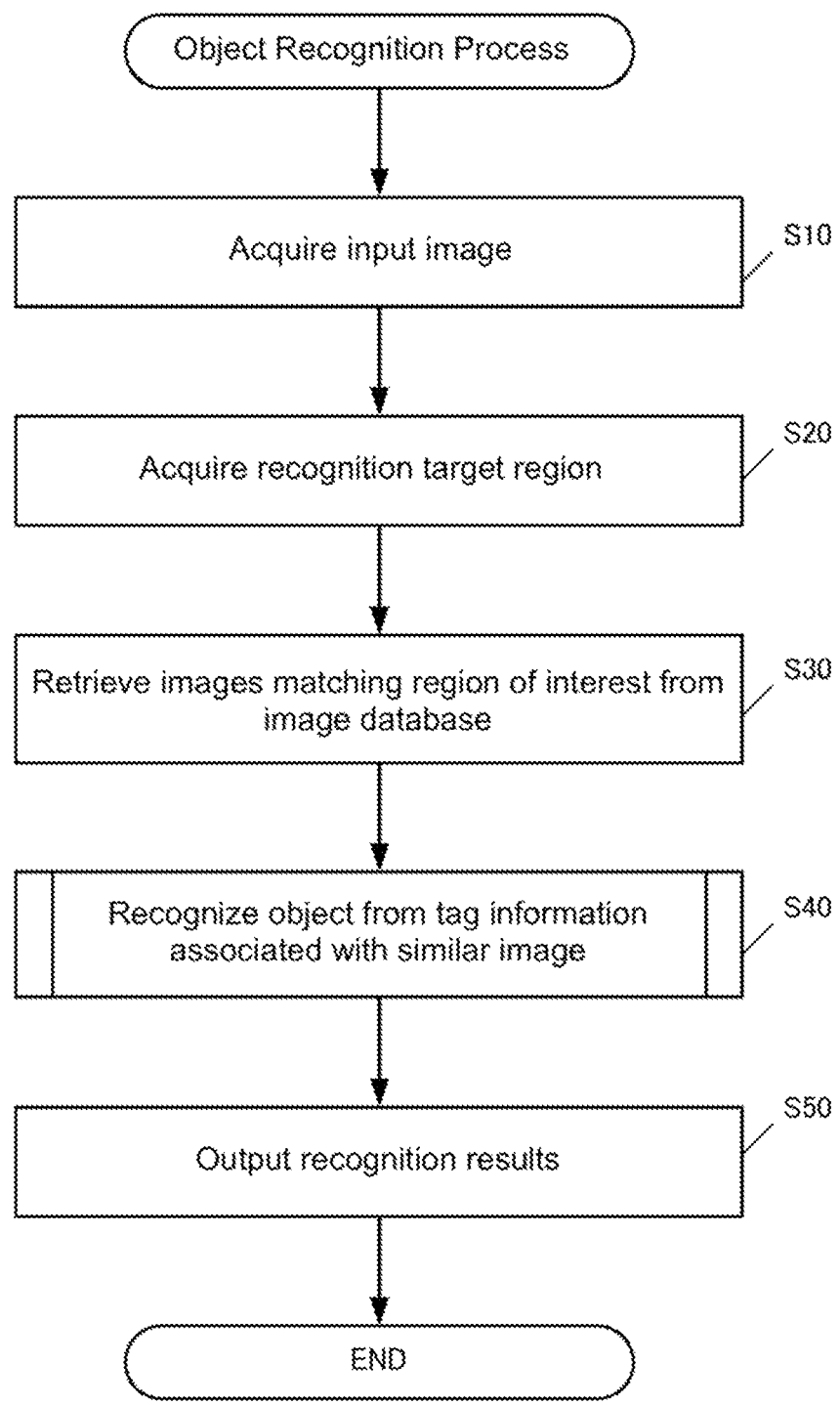
FIG. 3 is a flowchart representing the flow an object recognition process according to a first embodiment.

FIG. 2 provides an overview of the object recognition process carried out by the object recognition device 10; FIG. 3 is a flowchart illustrating the flow of the object recognition process run by the object recognition device 10. The object recognition process involves retrieving an image similar to the recognition target image from an image database and recognizing the object on the basis of tag information associated with the similar image. The specifics of the flowchart in FIG. 3 are described below.

The object recognition device 10 acquires an image (an input image) in step S10. An input image may be obtained from a camera 20 via the image input unit 11, from another computer via the communication device 14, or from storage media via the storage device 13.

The region extraction unit 110 extracts a local region from the input image, and that local region serves as a recognition target region (step S20). The method for extracting a recognition target region is not particularly limited. In a first embodiment, the user specifies a region in the input image. However, the recognition target region may be automatically extracted using any technique for extracting a region of interest. The algorithm used for extracting the region of interest is not particularly limited. In addition, the region of interest extraction step S20 may be eliminated and the in entire input image treated as a recognition target region. An image of a recognition targets region is referred to as a recognition target image below.

Figures 4A, 4B:
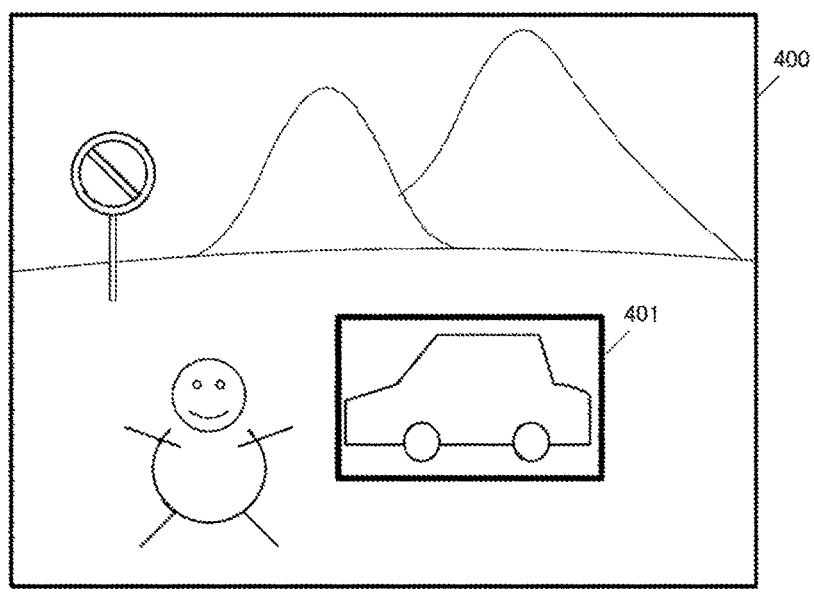
FIG. 4A is an example of a recognition target region.
FIG. 4B illustrates an example of results of content-based image retrieval.

FIG. 4A illustrates an example of an input image 400 and a recognition target region 401 extracted therefrom. In this example a vehicle is selected as the object to be recognized. Note that a plurality of recognition target regions may be extracted from the input image 400.

The image retrieval unit 120 issues a query to the image database 30 to retrieve images matching the recognition target image, and to acquire retrieval results from the image database 30 (step S30). On receiving a search query, the image database 30 retrieves an image from the database matching the search image included in the search query (an image of the region of interest) and transmits the retrieval result. Any known algorithm may be adopted for content-based image retrieval from the image database 30. For example, an algorithm that compares an entire image with another entire image, an algorithm that compares an entire image with a portion of another image, or an algorithm that compares a portion of one image with a portion of another image may be adopted. The image database transmits the similar image and the attribute information therefor to the object recognition device 10 as the retrieval result.

FIG. 4B depicts one example of the retrieval results obtained in step S30. FIG. 4B shows an image number 501, a relevance score 502, an overall size 503 of the similar image, a size 504 of the region in the similar image matching the region of interest, and tag information 505 stored in association with the similar image; however, the retrieval result may include other information.

The recognition unit 130 in the object recognition device 10 recognizes an object included in the recognition target region on the basis of the retrieval results obtained from the image database 13 and in particular the type information. As an example, the object that appears most frequently in the tag information included in the retrieval results may be determined as the recognition result. However, the meaning of the tag information assigned to images in the image database 30 are preferably unified through natural language processing prior to object recognition, since it may be assumed that the tag information may be expressed inconsistently, for instance.

Figure 5A:
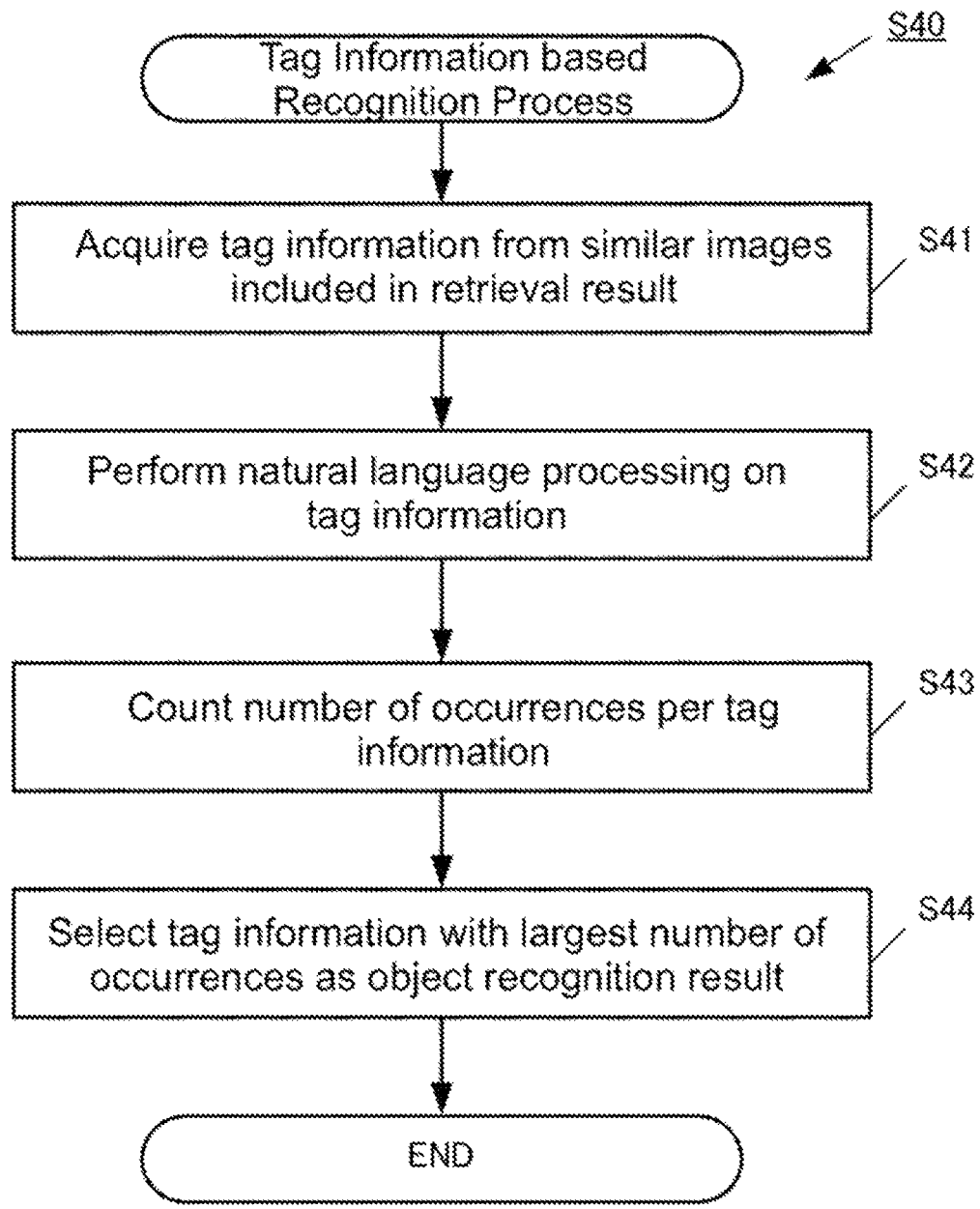
FIG. 5A is a detailed flowchart of an object recognition process that employs tag information.

FIG. 5A is a flowchart illustrating the specifics of the object recognition process in S40 using tag information. The recognition unit 130 acquires the tags associated with the similar images included in the retrieval results from step S30 (step S41). The recognition unit 130 then uses natural language processing to analyze and unify the meaning of the tag information (step S42). One example of unifying the tag information involves unifying the title words that represent the same meaning such as "automobile", "vehicle", "motor vehicle", "motorcar", "car" or the like. As another example, for instance, is where words for similar concepts, such as "automobile", "vehicle", "bus", "sports car" or the like can be unified into a single word (e.g., motor vehicle). Additionally, although the example only depicts cases where the tag information are single words, the tag information may be represented in sentence form, and the semantics thereof determined through natural language processing.

The recognition unit 130 counts the number of occurrences of the tag information after the process of consolidating the semantics in the tag information (step S43). The recognition unit 130 obtains the tag information with the largest number of occurrences (i.e., that has the highest frequency) as the recognition result for the object.

Figure 5B:
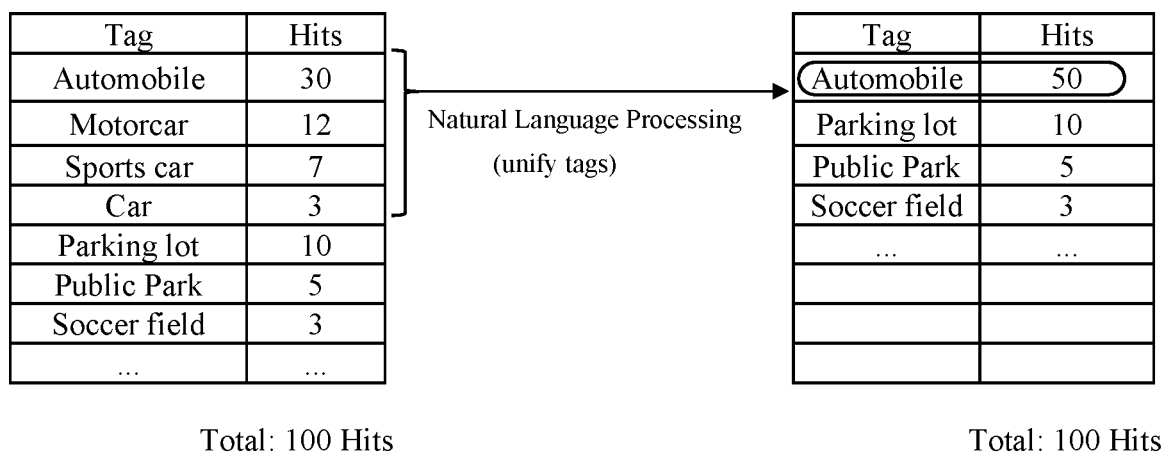
FIG. 5B is for describing natural language processing of tag information and recognition results therefrom.

FIG. 5B is for describing an example of the recognition process using the above-mentioned tag information. The graphic on the left side of FIG. 5B shows the tag information acquired in step S41 and the number of occurrences therefor. The graphic on the right side of FIG. 5B shows the tag information after natural language processing in step S42 (i.e., after consolidating the semantics in the tag information) and the number of occurrences therefor. In this example, natural language processing unifies the tag information "automobile", "motorcar", and "sports car" to "automobile". Given that after natural language processing the term "automobile" has the highest number of occurrences, the recognition unit 130 determines that the object included in the recognition target region is an automobile.

Note that while the number of search hits is listed as 100 hits in FIG. 5B, depending on the size of the image database 30 there may be tens of thousands or hundreds of thousands of search hits returned. In this case, natural language processing, counting the number of occurrences of a tag, and the like may take place in the image database 30 or another device with greater computational resources.

The output unit 140 outputs the recognition result from the recognition unit 130 (step S50). Results may be output in any desired format. For instance, the recognition result may be presented on an output device 16 such as a display, stored on a storage device 13, or transmitted to another device through the communication device 14. The recognition result may also be entered into other processes in the object recognition device 10.

Effects of the Embodiment

One or more embodiments may recognize an object on the basis of tag information for an image included in an image database; therefore, there is no need to carry out a training process beforehand that for instance creates a classifier for the object to be recognized. While the image recognition process of one or more embodiments requires an image database storing images with tags associated there with, the image database can be easily created by a normal user, and image databases already published by a third party may also be employed.

In cases where the accuracy of the object recognition process needs to be improved, this merely requires registering images and associated tags in the database, which is simple and low cost.

Finally, even if there are images registered in the image database with inappropriate tags associated with the image, if the image database contains the maximum amount of data, the effect of images with inaccurate tags associated therewith can be minimized in order to have accurate recognition.

Additional Modification Examples

In the above example, the number of occurrences of a tag is counted after the tag information obtained in the retrieval results are subject to natural language processing to unify the variety of meanings; however, the number of occurrences may be counted without attempting to unify the variety of meanings. The tag information having the highest occurrence is also output as the recognition result for the object; however, the tag information with a large predetermined number of occurrences may be output as a candidate recognition result. Here, the predetermined number may be a predefined value, a value that depends on the number of similar images acquired through the search, or may be the number of tag information where the number of occurrences thereof is greater than a certain value.

As above described, an object recognition device according to one or more embodiments improves recognition accuracy by registering this novel tagged image in the image database. Accordingly, the object recognition device preferably includes a registration unit for registering tagged images in the image database. The registration unit accepts images and tags (keywords or descriptions) of the aforementioned images, maps the images and tags and registers the same in the image database.

Second Embodiment

A second embodiment is described below. A second embodiment is basically identical to the first embodiment; here, however, a reliability score for the tag information associated with the simulated image is taken into account when performing recognition. If published on the Internet where a user may freely assigned tags, that image database 30 may not have times that are assigned correctly. It can be expected that an image database 30 with a large amount of data registered therein (big data) can absorb any inconsistencies in the tags assigned to individual images and provide a certain level of accuracy in recognition. Despite this, the recognition accuracy may be insufficient in such a case. Therefore, a second embodiment accounts for a reliability score for the tag information to improve the recognition accuracy.

Figure 6:
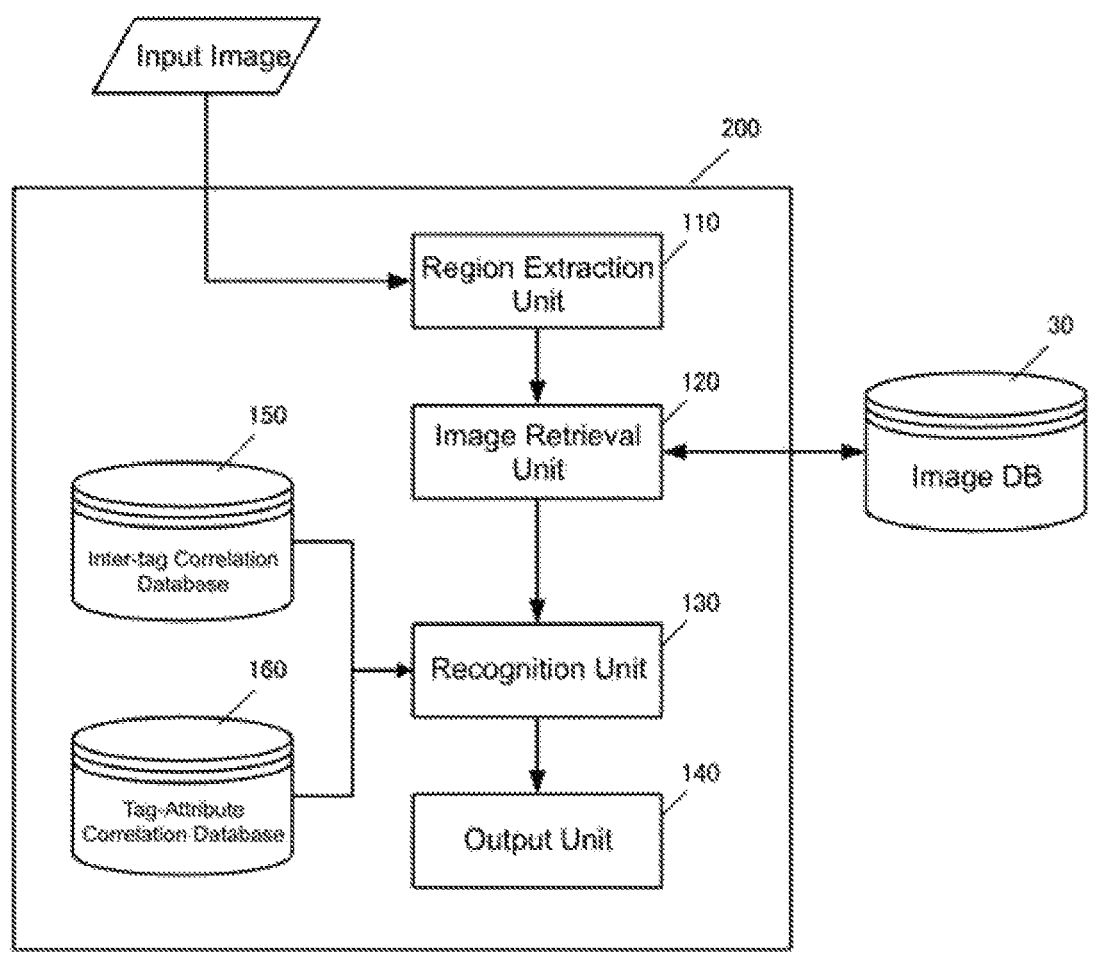
FIG. 6 is a function block diagram of an object recognition device according to a second embodiment.

The hardware configuration of an object recognition device 200 according to a second embodiment is identical to the hardware configuration of a first embodiment (FIG. 1A). FIG. 6 illustrates a functional block diagram implemented by the arithmetic device 12 in the object recognition device 200 according to a second embodiment running a program. The functional blocks in the object recognition device 200 are also basically identical to those in a first embodiment (FIG. 1B); here however, the object recognition device 200 is provided with an inter-tag correlation database 150 and a tag-attribute correlation database 160.

The inter-tag correlation database 150 stores the frequency (co-occurrence probability, correlation) that certain specific tags are simultaneously assigned to a single image in the image database 30. For example, when one hundred individual images in the image database 30 are assigned 'Tag A', and thirty of those images are assigned 'Tag B', the co-occurrence probability or the correlation between the Tag A and Tag B is 0.3 period Preferably the correlation between tags is determined after natural language processing to unify the semantics in the tag information.

The tag-attribute correlation database 160 stores the frequency (co-occurrence probability, correlation) that certain specific tags and certain attribute information are simultaneously assigned to a single image in the image database 30. For example, when one hundred individual images in the image database 30 are assigned 'Tag A', and forty of those images have 'Attribute C', the co-occurrence probability or the correlation between the Tag A and Tag B is 0.4. There is no need to calculate the correlation between the attribute information associated with an image and a tag when calculating the correlation; a correlation may be calculated between information obtained after processing the attribute information associated with the image and the tag. For instance, positional information (latitude and longitude) may be processed so that the type of location may be used (e.g., town, valley, coast, ocean, or the like) or title information may be processed so that the time of day may be used (morning, lunch time, evening, nighttime, or the like).

One specific example of the correlation stored in the tag-attribute correlation database 160 is the relationship between an "ocean" tag and attribute information pertaining to where an image was captured. The image capture location for an image with the "ocean" tag assigned thereto is very likely an image of the coast or on the sea, but less likely to be on land. As another example is the relationship between a "sunset" tag and attribute information pertaining to the time an image was captured. The image capture time for an image with the "sunset" tag is very likely to be in the evening (between 3 PM to 9 PM on the whole), while less likely to be at another time.

The inter-tag correlation database 150 and the tag-attribute correlation database 160 are preferably created on the basis of the images stored in the image database 30 and the tag information and attribute information associated therewith. However, the inter-tag correlation database 150 may be created on the basis of a general inter-language co-occurrence probability without referring to the image database 30. The tag-attribute correlation database 160 may also be created on the basis of images outside the image database 30. While the inter-tag correlation database 150 and the tag-attribute correlation database 160 are integrated into the object recognition device 200 according to a second embodiment, these databases may be constructed on devices external to the object recognition device 200 and the object recognition device 200 configured to access this external device.

Figure 7A:
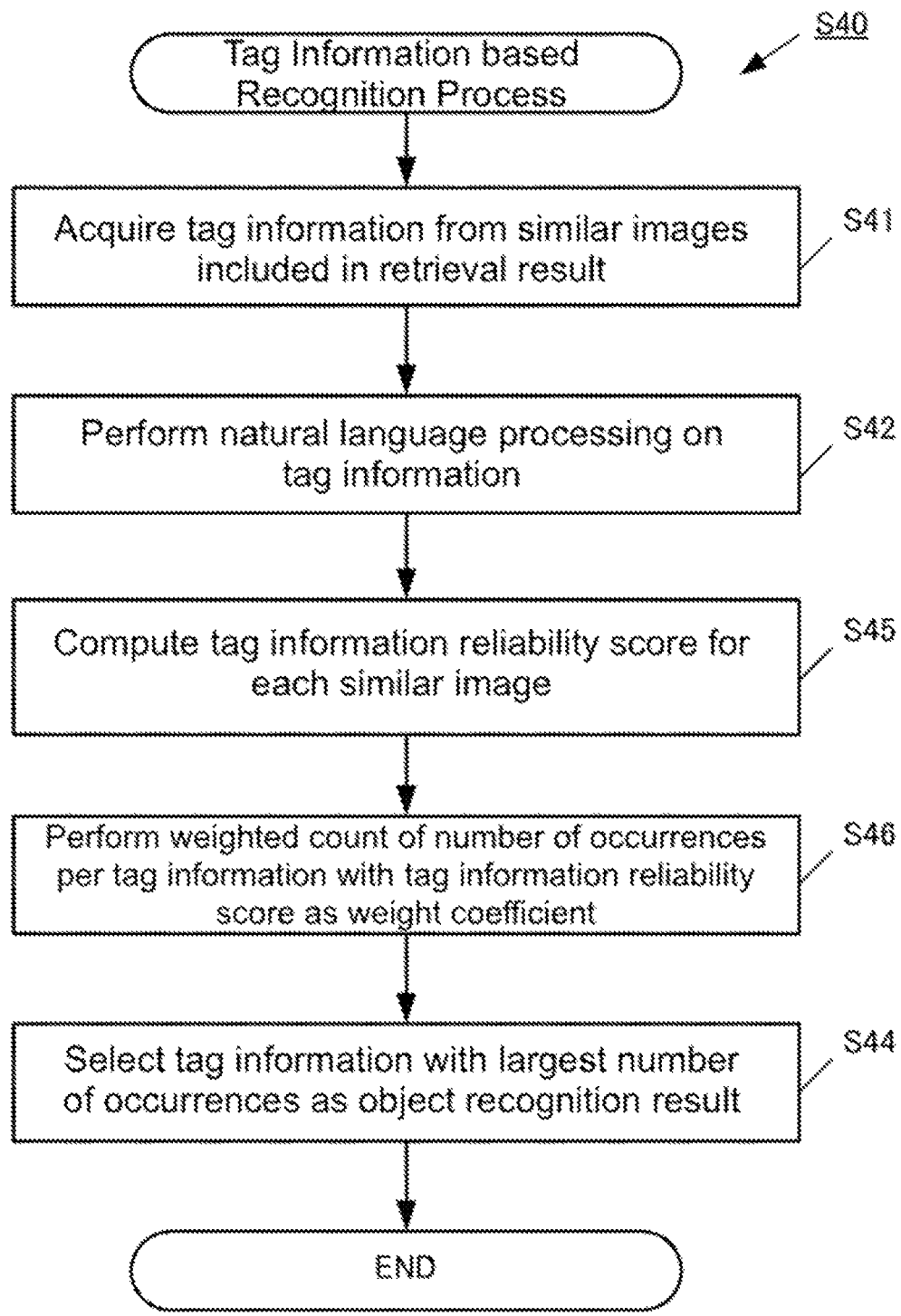

The overall flow of the object recognition process according to a second embodiment is identical to a first embodiment (FIG. 3). In a second embodiment, the processing in step S40 differs from a first embodiment. FIG. 7A is a flowchart illustrating the specifics of the process of recognizing an object S40 on the basis of on tag information. The processes identical to processes in a first embodiment (FIG. 5A) are given the same reference numerals and a description therefor is not repeated.

The processes of acquiring tag information (S41) and natural language processing of the tag information (S42) is identical to the processes in and a first embodiment and thus an explanation therefore is omitted. After step S42, in step S45 the recognition unit 130 computes a tag information reliability score for each of the similar images obtained through the search. The tag information reliability score is determined on the basis of a correlation between tags assigned to a similar image or a correlation between a tag and the attribute information for the image. FIG. 7B depicts an example of the criteria for computing a tag information correlation.

The correlation between tags is such that the reliability score increases as the correlation between the multiple tags contained in a single similar image increases. Tags can be determined as reliable when tags that are frequently assigned at the same time are assigned to a similar image; and tags can be determined as unreliable when multiple tags that are seldom (unlikely to be) used at the same time are assigned to a similar image. The recognition unit 130 queries the inter-tag correlation database 150 regarding the correlation score for plurality of tags assigned to a similar image, and computes the tag information reliability score on the basis of the correlation score obtained.

The correlation between attribute information (meta information) and a tag is such that the reliability score increases as the correlation between the tags included in a similar image and the attribute information for the similar image increases. As above described, when a certain time tag is frequently assigned to an image captured at a specific time or location, the tag may be determined as reliable if the tag information and the attribute information included in the similar image satisfies this relationship, undetermined as unreliable otherwise. The recognition unit 130 queries the tag-attribute correlation database 160 regarding the correlation for tag and attribute information assigned to a similar image, and computes the tag information reliability score on the basis of the correlation score obtained.

The size within the image may serve as a criterion for computing a reliability score for the tag information when retrieving an image including a local region similar to the search image during this image retrieval process. The larger the region matching the search image in the entire image containing the matching region the greater the probability that the tag is related to the object contained in that region; however, the smaller the region matching the search image in the entire image containing the matching region the lesser this probability. Accordingly, the size of the similar region in the overall image is a criterion that gauges the reliability score of the tag information. The recognition unit 130 computes a tag information reliability score on the basis of the relative size of the similar region in the similar image.

The location in the image may serve as a criterion for computing a reliability score for the tag information when retrieving an image including a local region similar to the search image during this image retrieval process. The more central the region matching the search image in the entire image containing the matching region the greater the probability that the tag is related to the object contained in that region; however, the more peripheral the region matching the search image in the entire image containing the matching region lesser this probability. Accordingly, the location of the similar region in the overall image is a criterion that gauges the reliability score of the tag information. The recognition unit 130 computes a tag information reliability score on the basis of the relative size of the similar region in the similar image.

The similarity score of the retrieval results may also serve as an indicator of the reliability score of the tag information. It is entirely possible that the object in a search image and the object in the similar image are different when the image has a low degree of similarity with the search image even when the image in the database has been correctly assigned tag information. Accordingly, because it can be said that a tag included in a similar image is less likely to represent an object in the search image when the similarity score is low, the recognition unit 130 computes the tag information reliability score as a low score in this case. Conversely, the recognition unit 130 computes the tag information reliability score as a higher score when the similarity score is high.

The recognition unit 130 combines the plurality of tag information reliability scores (individual reliability scores) computed thusly, to compute a final tag information reliability score. Any desired method may be used to combine the reliability scores; for instance, the final reliability score may be a product (infinite product), an average (a simple average or a weighted average), the maximum or minimum of all the individual reliability scores. Note that individual reliability scores are preferably normalized to values between zero and one. The tag information reliability scores (individual reliability scores) provided here are merely for example and there is no need to consider each of these to compute a final tag information reliability score. The reliability score may be computed using some of these, or the tag information reliability score may be computed on the basis of other criteria.

The recognition unit 130 counts per tag information a weight coefficient for the tag information reliability score obtained in step S45 as a way to number of occurrences (step S46). The value for the tag information reliability score and the value for the wait for efficient do not necessarily need to be identical values; the weight may increase as the tag information reliability score increases. The number of occurrences may be counted only occurrences with a tag information reliability score greater than or equal to a given threshold are counted. This is an example of assigning a weight coefficient of 1 when the tag information reliability score is greater than or equal to a certain threshold, and assigning a weight coefficient of zero when the tag information reliability score is less than the threshold.

The processing in step S44 is identical to the processing in a first embodiment; here however, the tag information with the most occurrences accounting for the tag information reliability score is taken as the object recognition result.

A second embodiment is capable of accounting for the reliability score for the tag information assigned to an image stored in the image database when recognizing an object. Hereby, it is possible to minimize the effects when a tag is improperly assigned to an image and provide accurate recognition.

While the inter-type of correlation database 150 and the tag-attribute correlation database 160 are created in advance in a second embodiment, the recognition unit 130 may obtain for instance, an inter-tag correlation score or a correlation score between a tag and attribute information when needed by querying the image database 30.

Third Embodiment

A third embodiment is described below. The process of outputting the object recognition result in a third embodiment differs from the first and second embodiments. More specifically, an object recognition result is output only when the relevance score for the recognition target region is high. A third embodiment is particularly effective when the object recognition device automatically selects an object recognition target region. Note that it is the modifications to a first embodiment that are described as an example below; however these modifications may be implemented based on the second embodiment.

Figure 8:
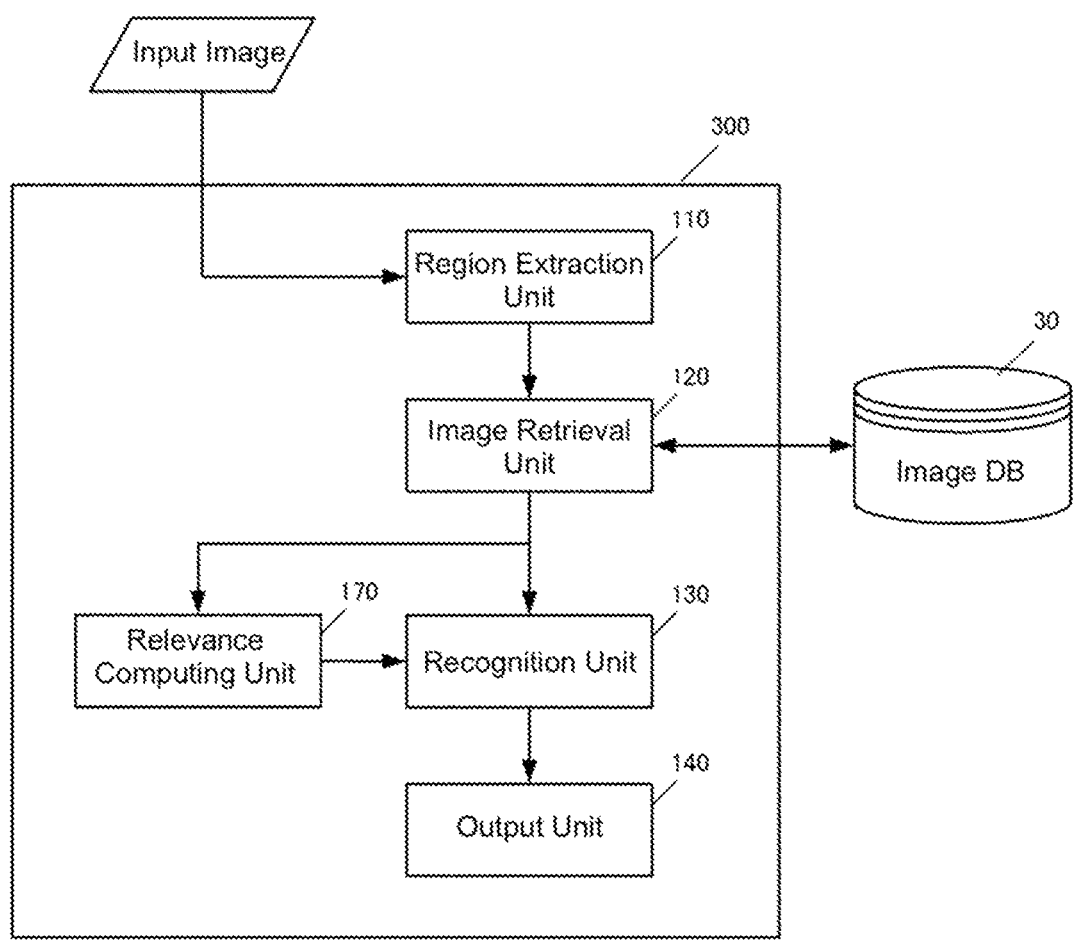
FIG. 8 is a function block diagram of an object recognition device according to a third embodiment.

The hardware configuration of an object recognition device 300 according to a third embodiment is identical to the hardware configuration of a first embodiment (FIG. 1A). FIG. 8 illustrates a functional block diagram implemented by the arithmetic device 12 in the object recognition device 300 according to a third embodiment running a program. The object recognition device 300 is further provided with a relevance computing unit 170 along with the functions in the first embodiment.

Figure 9:
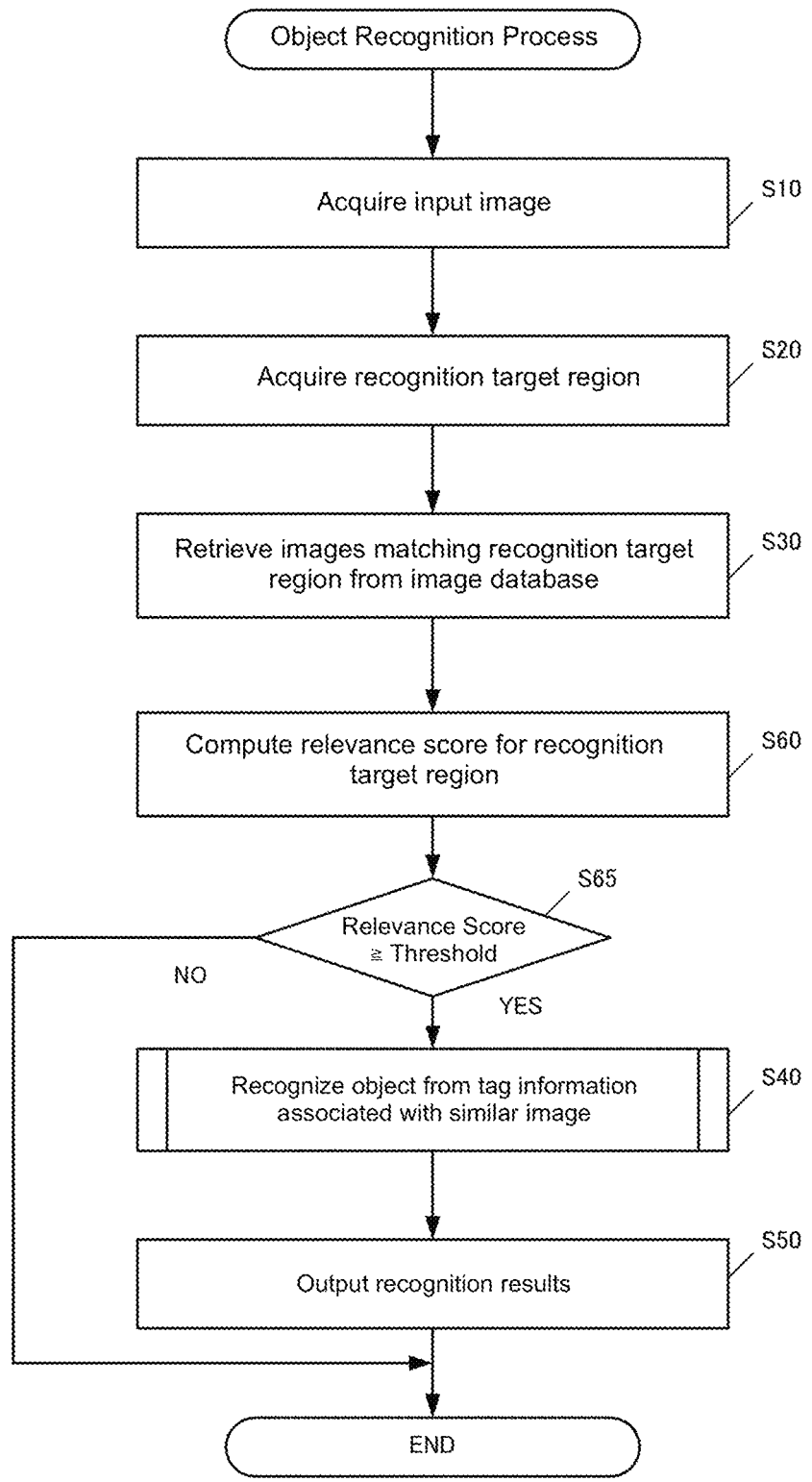
FIG. 9 is a flowchart representing the flow an object recognition process according to a third embodiment.

FIG. 9 is a flowchart illustrating a process of extracting her region of interest carried out by the object recognition device 300 of a third embodiment. The processes identical to processes in a first embodiment (FIG. 3) are given the same reference numerals and a description therefor is not repeated.

The process of acquiring an input image (S10) is identical to the process in the first embodiment. The process of acquiring a recognition target region (S20) is also identical to the process in the first embodiment; however, in a third embodiment the region extraction unit 110 uses a predetermined algorithm to extract the recognition target region instead of a user selecting the target. This process may adopt any relevant technique capable of extracting a region of interest from an image. The process of performing a content-based search (S30) is identical to the process in the first embodiment.

After step S30, a third embodiment computes a relevance score for a recognition target region in step S60. A relevance score is a value indicating the level of interest a person is estimated to have in the local region, or the level of interest a person should have in the local region. A certain local region with a high relevance score indicates that a person is either very interested in that local region, or should be very interested in that local region. The method of computing the relevance score is not particularly limited in a third embodiment. For example, the relevance score may be computed from only the information contained in the input image. As another example, a score created when extracting a region of interest may be selected as the relevance score. Alternatively, the relevance score may be computed using the results from image retrieval process performed in step S30. For instance, the relevance score may be computed to increase as the number of search hits for the similar image increases; or the relevance score may be computed to increase as semantic convergence of the tag information assigned to the similar images retrieved increases. The relevance score may also be computed on the basis of the size or location of the similar region in the similar image, attribute information (meta-information) or the like.

The recognition unit 130 determines whether or not the relevance score computed is greater than or equal to a threshold (step S65). If the relevance score is greater than or equal to the threshold (YES, S65), the recognition unit 130 runs an object recognition process (S40) and outputs the recognition results (S50) for the recognition target region. However, if the relevance score is below the threshold (NO, S65) the recognition unit 130 does not run the object recognition process. The object recognition process (step S40) and the output process (step S50) are identical to the processes in the first embodiment.

The object recognition device of a third embodiment is able to automatically extract from the input image a region that should be of interest, and outputs an image recognition result for that region. Because the relevance score is computed for the region extracted, the relevance score may be used to determine false positives even when a region that is of no interest is mistakenly selected as a region of interest. Additionally, because computing the relevance score is also used as a part of the retrieval from the image database, the relevance score may be computed on the basis of knowledge that cannot be obtained from just the input image, allowing for better accuracy when computing the relevance score. A portion of the two processes of computing the relevance score and recognizing an object may be shared on the basis of the image retrieval results, thereby improving processing efficiency.

Additional Embodiments

The embodiments described above are provided merely as examples and the invention is not limited to the specific example above described. The invention may be modified in various ways within the scope of the technical ideas therein.

In the above description, the image database and the object recognition device are on different devices; however the image database and object recognition device may be integrally configured as a single device. The image data included in the image database may also be registered by the manufacturer of the object recognition device or by a user. The object recognition device may employ a plurality of image databases including an image database built into the device and an image database on an external device.

An object recognition device according to embodiments may be packaged in any information processing device (i.e., computer) such as a desktop computer, a portable computer, a tablet computer, a smartphone, a mobile phone, a digital camera, or a digital video camera.

REFERENCE NUMERALS

10, 200, 300: Object recognition device
20: Camera
30: Image database
110: Region extraction unit
120: Content-based image retrieval unit
130: Recognition unit
140: Output Unit
150: Inter-tag correlation database
160: Tag-attribute correlation database
170: Relevance computing unit

The invention claimed is:
1. An object recognition device comprising:
a processor configured with a program to perform operations comprising:
acquiring a recognition target image that includes an object to be recognized;
searching an image database storing a plurality of images, each image of the plurality of images stored in association with tag information, retrieving one or more similar images of the plurality of images from the image database that match the recognition target image, and retrieving the tag information of the one or more similar images;
unifying a variety of meanings of the tag information of the one or more similar images by selecting a meaning representative of the variety of meanings as a representative meaning; and
recognizing the object included in the recognition target image based on the representative meaning of the tag information of the one or more similar images.

2. The object recognition device according to claim 1, wherein the processor is configured with the program to perform operations further comprising comprises recognizing the object included in the recognition target image based on a frequency of the tag information of the one or more similar images.

3. The object recognition device according to claim 2, wherein the processor is configured with the program to perform operations such that recognizing the object included in the recognition target image based on a frequency of the tag information comprises selecting tag information that appears most frequently among the tag information of the one or more similar images as a recognition result for the object included in the recognition target image.

4. The object recognition device according to claim 2, wherein the processor is configured with the program to perform operations such that recognizing the object included in the recognition target image based on a frequency of the tag information comprises selecting tag information with a high predetermined frequency of appearances among the tag information of the one or more similar images as a recognition result for the object included in the recognition target image.

5. The object recognition device according to claim 1, wherein the processor is configured with the program to perform operations such that unifying a variety of meanings of the tag information of the one or more similar images comprises performing natural language processing to unify the variety of meanings among tag information of the one or more similar images, and after performing the natural language processing, recognizing the object included in the recognition target image.

6. The object recognition device according to claim 1, wherein the processor is configured with the program to perform operations further comprising recognizing the object included in the recognition target image based on computing a tag information reliability score which indicates a reliability of the tag information of the one or more similar images and recognizing the object included in the recognition target image taking into account the tag information reliability score.

7. The object recognition device according to claim 6, wherein the processor is configured with the program to perform operations such that recognizing the object included in the recognition target image by computing the tag information reliability score comprises recognizing the object included in the recognition target image by computing the tag information reliability score based on a correlation between a plurality of tags assigned to a single similar image.

8. The object recognition device according to claim 7, further comprising a tag information correlation database configured to store a correlation between the plurality of tags, wherein
the processor is configured with the program to perform operations such that recognizing the object included in the recognition target image by computing the tag information reliability score comprises recognizing the object included in the recognition target image by querying the tag information correlation database to obtain the correlation between the plurality of tags assigned to the single similar image and increasing the tag information reliability score as the correlation increases.

9. The object recognition device according to claim 6, wherein the processor is configured with the program to perform operations such that recognizing the object included in the recognition target image by computing a tag information reliability score comprises recognizing the object included in the recognition target image by computing the tag information reliability score based on meta-information and the tag information of the one or more similar images.

10. The object recognition device according to claim 6, wherein the processor is configured with the program to perform operations such that recognizing the object included in the recognition target image by computing a tag information reliability score comprises recognizing the object included in the recognition target image based on a weighted frequency for the tag information with the tag information reliability score as a weight coefficient.

11. The object recognition device according to claim 1, wherein the processor is configured with the program to perform operations such that acquiring a recognition target image that includes an object to be recognized comprises outputting a local region from an input image as the recognition target image.

12. The object recognition device according to claim 11, wherein the processor is configured with the program to perform operations further comprising
computing a relevance score for the local region, wherein
outputting the local region from an input image as the recognition target image comprises outputting the local region with the relevance score greater than or equal to a threshold as a recognition result.

13. An object recognition method for execution on a computer, the object recognition method comprising:
acquiring a recognition target image that includes an object to be recognized;
searching an image database storing a plurality of images, each image of the plurality of images stored in association with tag information, retrieving one or more similar images of the plurality of images from the image database that matches the recognition target image, and retrieving the tag information of the one or more similar images;
unifying a variety of meanings of the tag information of the one or more similar images by selecting a meaning representative of the variety of meanings as a representative meaning; and
recognizing the object included in the recognition target image based on the representative meaning of the tag information of the retrieved similar image.

14. A non-transitory computer-readable storage medium storing a program for causing a computer to perform operations comprising operations of the method according to claim 13.

* * * * *